United States Patent [19]

Turpin

[11] Patent Number: 5,089,696
[45] Date of Patent: Feb. 18, 1992

[54] NETWORK OF SENSORS CONNECTED TO A REMOTE SUPPLY, MONITORING AND PROCESSING STATION

[75] Inventor: Marc Turpin, Bures sur Yvette, France

[73] Assignee: Thomson-CSF, Puteaux, France

[21] Appl. No.: 532,683

[22] Filed: Jun. 4, 1990

[30] Foreign Application Priority Data

Jun. 6, 1989 [FR] France .............................. 89 07451

[51] Int. Cl.⁵ ................................................ H01J 5/16
[52] U.S. Cl. ........................... 250/227.21; 250/231.1; 385/123
[58] Field of Search ...................... 250/227.21, 231.1; 350/96.29

[56] References Cited

U.S. PATENT DOCUMENTS

| | | | |
|---|---|---|---|
| 4,346,478 | 8/1982 | Sichling | 250/227.21 |
| 4,683,374 | 7/1987 | Weiss | 250/227.21 |
| 4,963,729 | 10/1990 | Spillman et al. | 250/227.21 |

Primary Examiner—Edward P. Westin
Assistant Examiner—T. Davenport
Attorney, Agent, or Firm—Oblon, Spivak, McClelland, Maier & Neustadt

[57] ABSTRACT

The disclosed network comprises standard sensors and intrinsic sensors with optic fibers. It is optically supplied. It has a circuit for addressing the channels of sensors with active couplers, also optically supplied. Each standard sensor is associated with an integrated optic element. The outputs of the sensors are all coupled to an optic fiber return bus.

8 Claims, 2 Drawing Sheets 5,089,696

NETWORK OF SENSORS CONNECTED TO A REMOTE SUPPLY, MONITORING AND PROCESSING STATION

BACKGROUND OF THE INVENTION

1. Field of the Invention

An object of the present invention is a network of sensors connected to a remote supply, monitoring and processing station.

2. Description of the Prior Art

There are known networks of sensors of physical variables, the connections of which are formed by multimode optical fibers. These networks have, for example, a star-like architecture, and they are operated by techniques of time-division or wavelength-division multiplexing.

Given the multimode nature of the optical lines, these networks do not make it possible to take sensors with intrinsic type optical fibers and/or integrated optic sensors, which require monomode optical fibers. Furthermore, the associated concepts of multiplexing in coherence cannot be applied to them, for example in the case of polarimetrical intrinsic sensors.

SUMMARY OF THE INVENTION

An object of the present invention is a network of sensors of physical variables that is capable of using standard (electro-mechanical, electrical or electronic) sensors and intrinsic sensors with optical fibers and/or with integrated optics, a network that is practically immunized against stray electromagnetic phenomena.

The network according to the invention, comprising sensors necessitating an electrical supply and/or intrinsic sensors of the above-mentioned type, comprises a first circuit with optical fibers for the optical supply of sensors necessitating an electrical supply, a second circuit with optical fibers and, as the case may be, with sensor-addressing integrated optic elements and a third circuit with at least one optical fiber for the return of the signal from the sensors, the different sensors being coupled to this optical fiber. Each standard sensor is connected to an integrated optic element that is positioned in the second circuit and provides for the connection between the electrical output of the sensor and the optical part of the network.

BRIEF DESCRIPTION OF THE DRAWINGS

The present invention will be understood more clearly from the following detailed description of an embodiment, taken as a non-restrictive example and illustrated by the appended drawings wherein.

DESCRIPTION OF A PREFERRED EMBODIMENT

Figure 1:
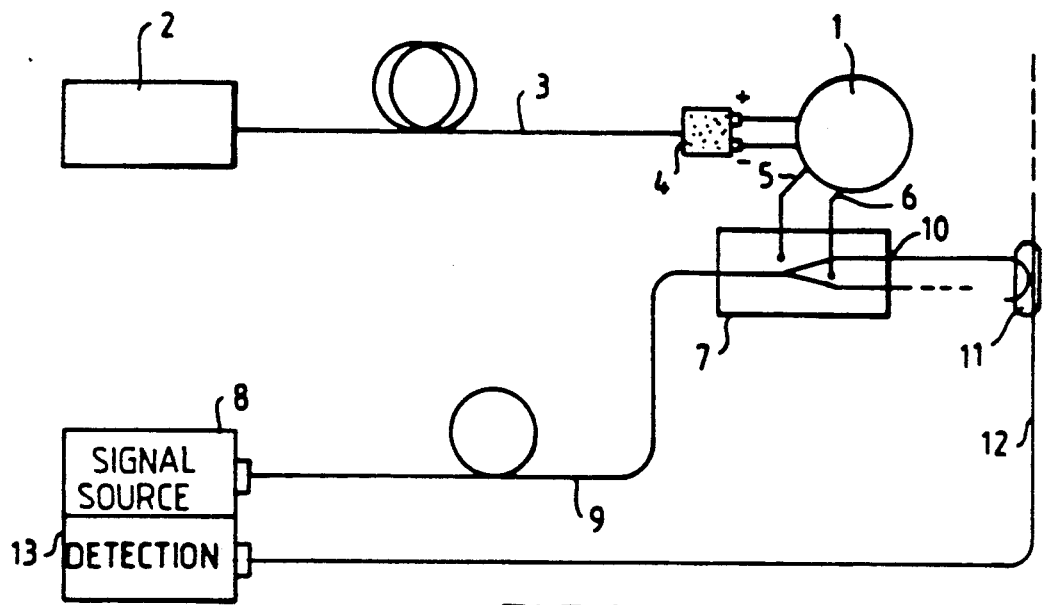
FIG. 1 is a connection diagram of an optically supplied sensor according to the invention.

The sensor 1 shown in FIG. 1 is one which requires electrical supply. It is a sensor of any physical variable or state: for example, it is a sensor of temperature, pressure or speed, or a detector of presence or intrusion, level, gas or radiation etc. This sensor 1 can work on an "all or nothing" basis, or else it may give different discrete signals for different detected values or else it may give analog values. This sensor may be passive (it may give only signals corresponding to detected or measured values) or it may be active or "intelligent", i.e., it may include means such as a processor, enabling it to initiate operations or to interface with a monitoring center. Further, it is possible to modulate the light flux of the optical supply circuit to make items of information reach the sensors without affecting the efficiency of photo-electrical conversion. In the rest of the description, the term "sensor" shall be used simply to designate anyone of these types of sensors or detectors.

The sensor 1 receives its supply energy from a source 2 through a multimode optical link 3 at the end of which there is placed a photoelectric element 4, as close as possible to the sensor 1. For example, with a photoelectric element (based on Si or GaAs) it is now possible to obtain a voltage of 5 volts and a power of some mW. A larger number of known sensors can thus be optically supplied. The sensor 1 is of the "all or nothing" or "all or little" type, and has two electrical outputs 5, 6. The output level (voltage) is a function of the state of the sensor: "all" state (active signal, alarm, threshold reached, etc. . . . ), "nothing" or "little" state (no signal, threshold not yet reached, standby etc.). These two outputs 5, 6 are connected to the control inputs of an integrated optic element 7 which is a change-over switch or a modulator with electrical control of optical paths or phases. In the example illustrated in FIG. 1, the element 7 is of the "Y" type, but it could also be of any other type, for example of the Mach Zehnder type, cobra type etc.

The active integrated optic circuit encodes the electrical information coming from the sensor in the form of optical information.

Should the sensor 1 have more than two outputs at which there appear different signals corresponding to different measured values (for example different thresholds or different temperatures), the optical element 7 should be of the type with several control inputs (see for example, the integrated optic element of FIG. 2), or else each of the different outputs of the sensor 1 must be connected to a corresponding integrated optic element.

The input of the element 7 receives a light signal from a source 8 through an optical fiber 9 which may be of the spatial monomode type or of the polarization conservation monomode type.

One of the outputs of the element 7, referenced 10, for example the output corresponding to the "state 1" of the sensor 1, is connected by a coupler 11 to a fiber 12 acting as a signals collector bus. The optical fiber 12 may be either monomode or multimode. Depending on the type of fiber, the coupler 11 is a monomode-monomode passive coupler or a monomode-multimode passive coupler. This fiber 12, which is of the multimode type, is connected to a detection device 13.

The sources 2 and 8 and the detection device 13 may be brought together in a monitoring and processing station remote from the sensor 1: the maximum possible remoteness from this sensor 1 is a function of the qualities of the optical fibers used and may reach several hundreds of meters with presently known fibers. As explained below, from said station it is possible to supply and monitor a large number of sensors in using only a small number of fibers for the long-distance connection to the distant station. Clearly, other far shorter fibers may be used for the local connections.

Figure 2:
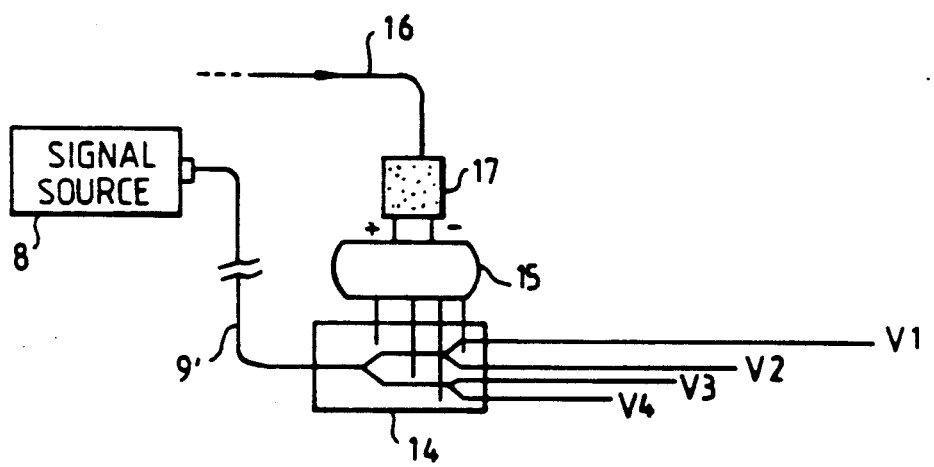
FIG. 2 is a drawing of a detail of an active coupler, optical supplied according to the invention.

FIG. 2 shows a local distributor of light signals distributing the signal from the source 8 to four elements such as the element 7 of FIG. 1. The source 8 is connected by a monomode fiber 9' to an optically supplied active integrated optic 14 of the type having at least one input and several outputs, four in the present example, marked V1 to V4. The coupler 14 has four control inputs corresponding to the outputs V1 to V4, connected to a time-division multiplexing circuit 15. The circuit 15 is a standard electronic multiplexing circuit made, for example, by means of C-MOS technology with low consumption. This circuit 15 is optically supplied, by the source 2 for example, through a multimode optic fiber 16 and a photo-electric cell 17. The outputs V1 to V4 of the coupler 14 are each connected by a monomode optic fiber to an element such as the element 7 of FIG. 1.

Figure 3:
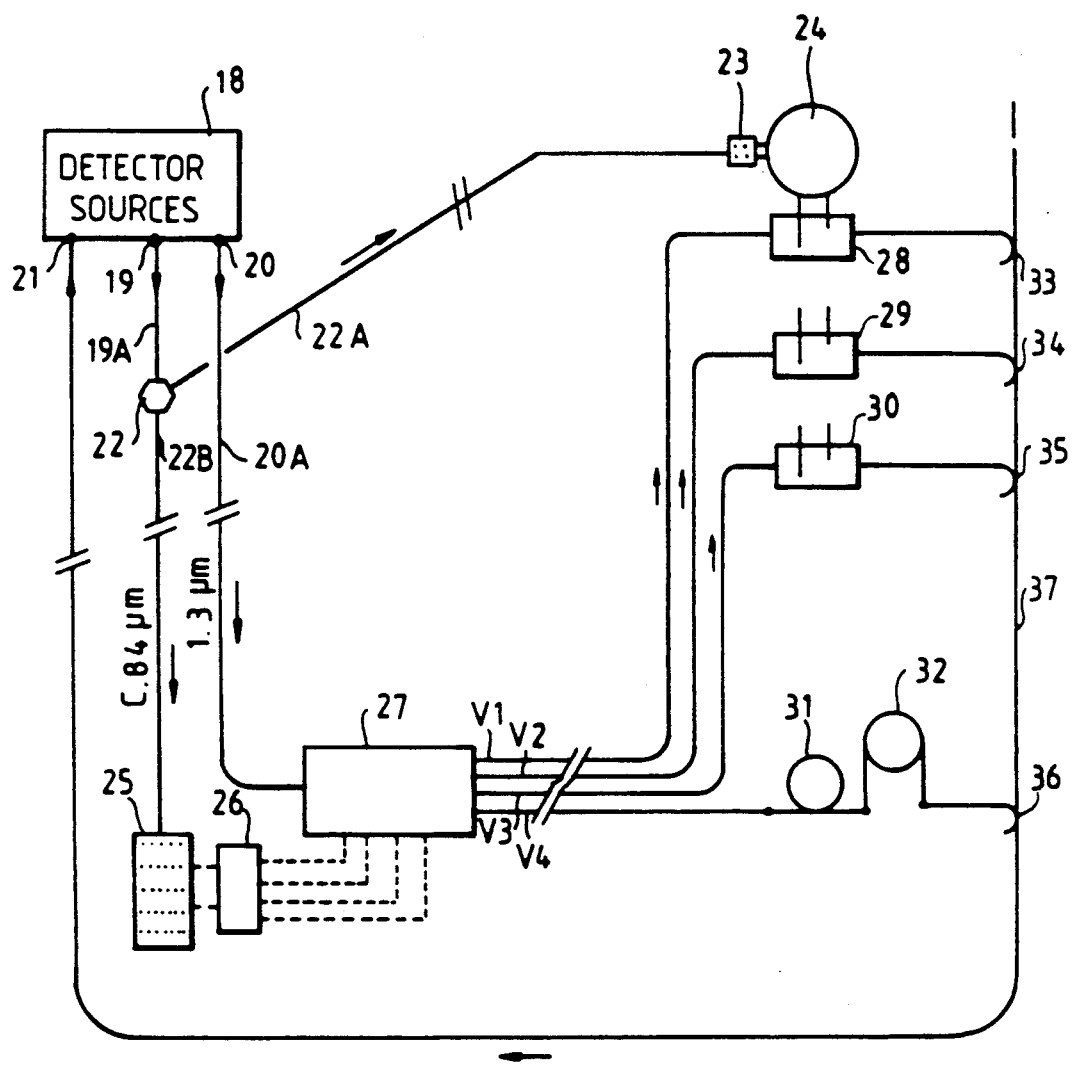
FIG. 3 is a drawing of an example of a network of sensors according to the invention.

The exemplary network shown in FIG. 3 includes a supply, monitoring and processing station 18 comprising devices similar to the devices 2, 8 and 13.

The station 18 includes two main outputs, referenced 19 and 20, respectively corresponding to the optically supplied source and to the coherent or slightly coherent light signal source and an input 21 of a circuit for detecting and processing signals from the sensors.

The output 19 is connected by an optical fiber 19A to a star-like coupler or distributer 22 which may be close to or remote from the station 18. The coupler 22 is of the type with several outputs, only two of which have been shown. The outputs of the coupler 22 are connected by optical fibers to photo-electrical optical supply devices which may be individual ones such as, for example, the cell 23 (through the fiber 22A) supplying a single sensor (sensor 24) or collective ones such as, for example, the photo-electrical device 25 (through the fiber 22B) which is used, in the present example, to supply not the sensors but multiplexing circuits such as the circuit 26. The multiplexer 26 (which is similar to the multiplexer 15 of FIG. 2) has its different outputs connected to the control inputs of an active coupler 27 (similar to the coupler 14 of FIG. 2). The optical fibers for connection between the station 18 and the photoelectrical elements are multimode fibers (fibers 19A, 22A, 22B).

The output 20 of the station 18 (coherent or slightly coherent light signal output) is connected by a monomode optical fiber 20A to the signal input of the coupler 27. In the example shown, the coupler 27 has four outputs but it is clear that it could have more of them, or that a plurality of couplers could be combined to increase the number of output channels.

Each of the output channels V1 to V3 of the coupler 27 is connected by a monomode optic fiber to a switchover element respectively referenced 28 to 30. These elements 28 to 30 are similar to the element 7 of FIG. 1. The element 28 is controlled by the sensor 24 in the same way as the element 7 is controlled by the sensor 1. The couplers controlling the elements 29 and 30 have not been shown. These couplers are optically supplied in the same way as the sensor 24 from the coupler 22 or a similar coupler connected to the output 19.

The channel V4 is connected to an intrinsic sensor device with optic fibers and/or intrinsic optics, of the distributed interferometrical and/or polarimetrical type comprising at least one polarimetrical or interferometrical sensor. In the present example, it has two sections of optical fibers 21, 32. This is possible through the fact that the fibers 20 and, in particular, that of the channel V4 as well as the fibers 31 and 32 are birefringent monomode fibers with conservation of linear polarization. Thus, with the time-division multiplexing used to address the different measuring channels V1 to V4, it is possible to associate the technique of multiplexing in coherence (or low coherence) proper to the polarimetrical (and/or interferometrical) distributed sensors, using the specific properties of the optical fibers with conservation of polarization.

The outputs of the elements 28 to 30 and the sensor 31, 32 are connected by corresponding passive couplers 33 to 36 to a bus 37 formed by an optical fiber, for example of the multimode type connected to the input 21 of the station 18. According to one variant, the bus 37 may include several monomode fibers, each connected to a set of sensors. A set of sensors may include, for example, sensors of one and the same nature or sensors located in one and the same geographical zone.

Thus, through the optical supply of the sensors such as the sensor 24, the electrical connections of the network of sensors are sharply limited or even eliminated. This given it properties of immunity to stray electromagnetic phenomena (it is easy to provide efficient shielding for the station 18 which may be furthermore positioned in a place where the stray electromagnetic phenomena are far weaker than in the locations where the sensors are laid out) and galvanic insulation. In the same way, each electrical or electronic sub-system associated with the sensors may be shielded locally.

What is claimed is:

1. A network for linking sensors to a remote supply, monitoring and processor station, said network comprising:
    a plurality of sensors each requiring a supply of flight energy for operation thereof and each having light modulating output means for modulating a carrier light signal with information sensed thereby;
    a first optical fiber circuit for providing the supply of light energy to each of the plurality of sensors;
    a second optical fiber circuit for individually addressing each of the plurality of sensors, the second optical fiber circuit including:
    at least one integrated optical active coupler having at least one input for receiving the carrier light signal and several outputs individually connected to the light modulating output means of each of the plurality of sensors by separate optical fiber elements; and
    an electronic multiplexer means for connecting the input of the coupler to a selected one of the several outputs of the coupler; and
    a third optical fiber circuit having at least one optical fiber for the return of the carrier signal supplied by the selected output of the optical coupler and modulated with information, each of the plurality of sensors being coupled to this at least one optical fiber.

2. A network according to claim 1, wherein the second optical fiber circuit comprises spatial monomode optical fibers.

3. A network according to claim 1, wherein the second optical fiber circuit comprises monomode optical fibers with conservation of polarization.

4. A network according to claim 1, wherein at least one of the light modulating output means is an integrated optic element positioned at the second optical fiber circuit, which converts an electrical output of an associated sensor to an optical output for modulating the carrier signal.

5. A network according to claim 1, wherein the electronic multiplexing device is optically supplied from the first optical fiber circuit.

6. A network according to claim 1, wherein at least one of the plurality of sensors is an optical fiber polarimetrical sensor.

7. A network according to claim 1, wherein at least one of the plurality sensors is interferometrical optical fiber sensor.

8. A network according to claim 1, wherein the each of the sensors is addressed by multiplexing in coherence.

* * * * *